Patented Mar. 11, 1952

2,588,441

UNITED STATES PATENT OFFICE 2,588,441

PREVENTION OF CORROSION

Franklin M. Watkins, Flossmoor, Ill., assignor to Sinclair Refining Company, New York, N. Y., a corporation of Maine No Drawing. Application April 27, 1949, Serial No. 90,040. In Canada December 23, 1948

2 Claims. (Cl. 106—14)

This invention relates to preventing the corrosion of metallic surfaces.

As is well understood, the corrosion of various metallic surfaces, particularly iron and steel, in contact with fresh or salt water, methyl and other monohydric alcohols, ethylene and higher glycols, and the like, occasions a serious economic loss, and it is therefore the object of the present invention to provide a means whereby that loss may be substantially reduced.

The aforementioned object is accomplished in accordance with the present invention by incorporating into liquids, such as fresh or salt water, methyl alcohol, ethyl alcohol, ethylene glycol, propylene glycol, and mixtures thereof, in contact with metallic surfaces, such as iron, steel, and copper, a minor proportion of an ammonium mahogany sulfonate, a morpholine mahogany sulfonate, a monocyclohexylamine mahogany sulfonate, or a mixture of such sulfonates. In general, from about 0.002 to about 0.4% by weight, based upon the weight of the liquid, of the mahogany sulfonate, or mixture of sulfonates, on an oil-free basis, is used.

Mahogany sulfonates are soaps of sulfonic acids obtained by reacting petroleum oils with strong, usually fuming, sulfuric acid. The preferentially oil-soluble sulfonic acids remain dissolved in the acid-treated oil and are commonly known as mahogany acids. In the practice of the present invention, the mahogany sulfonate is usually employed as a concentrate in the oil from which it is derived.

A typical ammonium mahogany sulfonate concentrate may have, for example, a sulfonate concentration of about 10% by weight and may test as follows:

| | |
|---|---|
| Gravity, °API | 28.0 |
| Flash, °F | 385 |
| Fire, °F | 445 |
| Viscosity at 100° F. SUS | 416 |
| Viscosity at 130° F. SUS | 163 |
| Viscosity at 210° F. SUS | 49.2 |
| Viscosity index | 90 |
| Color | 4.5 |
| Nitrogen (per cent) | 0.265 |
| Acid number | 9.0 |
| Sulfur (per cent) | 0.60 |

This particular concentrate was prepared by treating a Mid-Continent neutral oil with four successive dumps of oleum, a total of 120 pounds of the oleum being used for each barrel of oil. Following removal of the separable sludge after the last dump of oleum, the acid oil was blown with air to remove $SO_2$ and settled to remove substantially the last trace of sludge. Thereafter the oil was mixed with 0.6% by weight of water and neutralized with an excess of anhydrous ammonia. Finally the oil was heated to a temperature of 280° F. to dehydrate it, and filtered to obtain the above product.

A typical morpholine mahogany sulfonate concentrate may also have a sulfonate concentration of about 10% by weight and may test as follows:

| | |
|---|---|
| Gravity, °API | 26.9 |
| Flash, °F | 380 |
| Fire, °F | 440 |
| Viscosity at 100° F. SUS | 225.2 |
| Viscosity at 130° F. SUS | 125.6 |
| Viscosity at 210° F. SUS | 47.1 |
| Viscosity index | 85 |
| Color | 4.5 |
| Nitrogen (per cent) | 0.279 |
| Acid number | 12.0 |
| Sulfur (per cent) | 0.71 |

This particular concentrate was prepared by treating a Mid-Continent neutral oil with four successive dumps of oleum, a total of 120 pounds of the oleum being used for each barrel of oil. Following removal of the separable sludge after the last dump of oleum, the acid oil was blown with air to remove $SO_2$ and settled to remove substantially the last trace of sludge. Thereafter the oil was mixed with 0.6% by weight of water and neutralized with an excess of morpholine. Finally the oil was heated to a temperature of 280° F. to dehydrate it, and filtered to obtain the above product.

Likewise, a typical monocyclohexylamine mahogany sulfonate concentrate may have a sulfonate concentration of about 10% and may be prepared as follows: An acid oil was prepared by treating a Mid-Continent neutral oil with successive dumps of oleum, a total of 150 pounds of oleum being used for each barrel of oil. Following removal of the separable sludge after the last dump of oleum, the acid oil was blown with air to remove $SO_2$ and settled to remove substantially the last trace of sludge. The acid oil thus prepared had the following characteristics:

| | |
|---|---|
| Gravity, °API | 29.4 |
| Viscosity at 100° F. SUS | 205 |
| Viscosity at 210° F. SUS | 47.2 |
| Acid number | 13.4 |

A portion of this acid oil was then reacted with approximately the theoretical quantity of monocyclohexylamine, as determined by the acid number of the acid oil, to produce the cyclohexylamine mahogany sulfonate. The reaction was performed by stirring the acid oil and cyclohexylamine in admixture with each other for about two hours, during which period the temperature rose from about 80° F. to about 100° F. The reaction mixture was cleared of a slight haze by filtration, and the filtrate diluted with neutral oil to give a concentrate analyzing about 10% by weight of cyclohexylamine mahogany sulfonate.

A crude ammonium, morpholine or cyclohexylamine mahogany sulfonate will usually contain from about 8 to about 12% by weight of the sulfonate, and when the crude sulfonates are employed as an inhibitor the amount of crude material taken will increase with the percentage of oil, as distinguished from sulfonate, in the mixture.

The ammonium, morpholine and cyclohexylamine mahogany sulfonates may be used to advantage in reducing the metallic corrosion customarily encountered in refinery cooling water system in which the cooling water is continuously passed through an atmospheric cooling tower and returned to the equipment being cooled, for example, a condenser. In order to obtain comparative data concerning the operating conditions which prevail in an atmospheric cooling tower system, a test strip of iron was suspended in boiling distilled water for two hours, during which period the water was aerated for fifteen minutes. Corrosion was severe and pitting of the iron was apparent. The test was repeated, this time admixing with the water 0.1% by weight of the ammonium mahogany sulfonate concentrate containing 10% by weight of ammonium mahogany sulfonate and further identified above by its characteristics. The addition of the ammonium mahogany sulfonate concentrate turned the water milky, but there was no apparent tendency for the solution to foam even at boiling temperatures. The iron strip suspended in the water containing the ammonium mahogany sulfonate concentrate showed no evidence of corrosion at the end of two hours of boiling, including the fifteen minute aeration period. Further comparative tests were conducted in a similar manner, substituting a copper strip for the iron strip previously used. When no ammonium mahogany sulfonate concentrate was admixed with the water, some tarnishing of the copper strip was apparent at the end of the test, whereas when 0.1% by weight of the ammonium mahogany sulfonate concentrate was admixed with the water the tarnishing of the copper was noticeably decreased, there being no apparent corrosion or attrition of the copper by any basic salts.

The ammonium, morpholine and cyclohexylamine mahogany sulfonates may also be used effectively in reducing the corrosion of metals, particularly iron and steel, in contact with water having an appreciable content of sodium chloride. Thus, the following test has been conducted upon an ocean-going tanker engaged in the transportation of gasoline and kerosene, the test extending over a period of time exceeding eight months. At various times, the tanker carried in its tanks sea water as ballast. During the times when the tanker was carrying such ballast, one tank containing sea water had incorporated therein 0.05%, based upon the weight of the sea water, of the ammonium mahogany sulfonate concentrate described above, whereas a different tank containing sea water contained no inhibitor. Several removable steel coupons inserted in the tank containing the ammonium mahogany sulfonate had an average corrosion of 0.026 mil per year, whereas several removable steel coupons in the tank containing no inhibitor showed an average corrosion of 12.3 mils per year.

To illustrate further the effect of ammonium, morpholine and cyclohexylamine mahogany sulfonate in reducing the corrosion occasioned by sea water, there was performed the following test, which is a modification of the Navy Department Specification 51-I-11, May 15, 1945: A mixture of 1% by weight of the ammonium mahogany sulfonate concentrate, containing 10% by weight of ammonium mahogany sulfonate and further described above by its characteristics, in drinking water was made up and an emulsion was formed by shaking the mixture. The emulsion was then poured into a 250 ml. mixing cylinder containing a polished, measured and weighed flat steel strip. Sufficient synthetic sea water was added to give a chloride ion content of 50 parts per million, and the pH was adjusted to 8-9 with trisodium phosphate solution. The mixture was then thoroughly shaken and was put in a 150° F. constant temperature bath for 100 hours. At the end of the 100 hour period, the strip was removed, wiped clean, and examined for corrosion. The strip was then cleaned chemically with boiling aqueous sodium hydroxide-zinc dust mixture, rinsed with water, dried, and weighed.

The rate of corrosion in inches per years was calculated by the formula:

$$\frac{\text{Weight loss (grams)}}{\text{Area (square inches)}} \times 0.683 = \text{inches per year}$$

In three determinations, the average rate of corrosion when the crude ammonium mahogany sulfonate was employed as described as an inhibitor was 0.00010 inch per year. The Navy Department Specification mentioned above permits a corrosion rate of 0.0002 inch per year.

The ammonium, morpholine and cyclohexylamine mahogany sulfonates may also be used effectively in reducing the corrosion which normally takes place in the cooling systems of internal combustion engines in which fresh water, methyl alcohol, ethyl alcohol, ethylene glycol, propylene glycol, and mixtures thereof, are circulated as a cooling medium. In order to demonstrate the effectiveness of the aforementioned inhibitors in this connection, there was used a test procedure which consisted of total immersion of test coupons which were rectangular strips of copper and 1020 steel, each of 20 square centimeter area, held in position by a brass bolt and separated by a stainless steel washer, in one liter of anti-freeze composition at 140° F., and stirring at 1,000 R. P. M. with a stainless steel paddle for from 4 to 7 days. The coupons were then inspected and rated. The loss of anti-freeze composition by evaporation was negligible.

Comparisons were made with two well-known commercially available anti-freezes, hereinafter designated as "A" and "B." The former was essentially methyl alcohol containing 1.4% water, a rust inhibitor or mixture of inhibitors and a violet dye. The latter was mainly ethylene glycol containing 4% water, a neutral inhibitor and a blue dye. The latter was turbid, and upon diluting it with water an oil layer separated which amounted to 2% by volume of the antifreeze.

In performing the tests, commercial ethyl alcohol and commercial ethylene glycol were used. Each of these materials was diluted with tap water (pH 8) to 50 and 20 volume percent solutions.

The tests results are listed in the tables below, in which RD-119 signifies the ammonium mahogany sulfonate concentrate prepared as described above containing 10% by weight of ammonium mahogany sulfonate and there further identified by its characteristics.

*Table I*

[50 volume percent ethylene glycol in tap water.]

| | | | | |
|---|---|---|---|---|
| Volume percent RD-119 | 0 | 0.1 | 0.5 | 55 vol. percent B. 45 vol. percent tap water. |
| Days on test | 1 | 7 | 7 | 7. |
| Steel strip appearance | Heavy rust | Very light rust on 5% of surface. | Perfect | Perfect. |
| Steel strip weight change, mgs./sq. cm. | −2.3 | −0.03 | +0.01 | +0.09. |
| Copper strip appearance | Bright red | No film | Chalky film, rubs off. | Peacock chalky film. |
| Copper strip weight change, mgs./sq. cm. | +0.04 | −0.01 | +0.02 | −0.07. |

*Table II*

[20 volume percent ethylene glycol in tap water.]

| | | | |
|---|---|---|---|
| Volume percent RD-119 | 0 | 0.2 | 20 vol. percent B. 80 vol. percent tap water. |
| Days on test | 1 | 4 | 4. |
| Steel strip appearance | Heavy rust | Light rust on 25% of surface. | Light rust on 5% of surface. |
| Steel strip weight change, mgs./sq. cm. | −3.2 | −0.015 | −0.09. |
| Copper strip appearance | Dull, etched. | Red | Yellow discoloration. |
| Copper strip weight change, mgs./sq. cm. | +1.2 | −0.02 | −0.07. |

*Table III*

[50 volume per cent methyl alcohol in tap water.]

| | | | | | | |
|---|---|---|---|---|---|---|
| Volume per cent RD-119. | 0 | 0.1 | 0.5 | 1.25 | 2.5 | 55 Vol. per cent A. 45 Vol. per cent tap water. |
| Days on test | 1 | 7 | 7 | 7 | 7 | 7. |
| Steel strip appearance | Heavy rust | Very light rust over 40% of surface. | Very light rust over 15% of surface. | Very light rust over 15% of surface. | No rust | No rust. |
| Steel strip weight change, mgs./sq. cm. | −4.4 | +0.01 | −0.04 | +0.01 | +0.01 | +0.04. |
| Copper strip appearance | Dull, etched. | Bright peacock. | Dark peacock. | Dark violet. | Chalky film, rubs off. | Light film. |
| Copper strip weight change, mgs./sq. cm. | +0.07 | −0.03 | −0.17 | −0.30 | +0.10 | +0.07. |

*Table IV*

[20 volume per cent methyl alcohol in tap water.]

| | | | |
|---|---|---|---|
| Per cent RD-119 | 0 | 0.8 | 20 vol. per cent A. 80 vol. per cent tap water. |
| Days on test | 1 | 4 | 4. |
| Steel strip appearance | Heavy rust | 6 pin points rust. | Medium rust on 5 per cent of surface. |
| Steel strip weight change, mgs./sq. cm. | −4.4 | −0.07 | −0.02. |
| Copper strip appearance | Dull, etched | Red | Red. |
| Copper strip weight change, mgs./sq. cm. | +1.0 | −0.03 | +0.04. |

*Table V*

[Static tests at 75° F. Run after stirring test at 140° F.]

| Composition | Days on Test | Steel Strip Rating |
|---|---|---|
| 0.5% RD-119 in 50% Methanol | 25 | Perfect (i. e., no rust). |
| 1.25% RD-119 in 50% Methanol | 25 | Perfect. |
| 20% A | 21 | Do. |
| 0.8% RD-119 in 20% Methanol | 21 | Do. |
| 20% B | 21 | Do. |
| 0.2% RD-119 in 20% glycol | 21 | Few pin points rust. |

After completing the above tests, which were run at 140° F. with stirring, several of the antifreeze solutions were placed in a closed system with fresh steel coupons and tested at 75° F. un-under static conditions. The results of these tests are given in Table V below.

Static tests were also run for three days at 75° F. on 50% methyl alcohol solutions with copper and steel coupons joined by a brass bolt. The purpose of these tests was to develop information on the rust inhibiting properties of RD-119 for methanol solutions used in airplane fuelinjection mixtures. The results of these tests are listed in Table VI below.

Table VI
[Static tests on 50% methyl alcohol in tap water. Copper and steel coupons.]

| Per cent RD-119 | 0 | 0.2 | 0.5 | 1.0 | 2.0 |
|---|---|---|---|---|---|
| Steel strip appearance | Light to medium rust on 60% surface. | 2 pin points rust. | Perfect. | 2 pin points rust. | Perfect. |
| Steel strip weight change, mgs./sq.cm. | −0.38 | −0.07 | −0.01 | +0.03 | −0.1. |
| Copper strip appearance | (¹) | (¹) | (¹) | (¹) | (¹) |
| Copper strip weight, change, mgs./sq.cm. | −0.01 | −0.02 | −0.02 | −0.01 | −0.3. |

¹ Unchanged in all instances.

After the conclusion of the preceding test, the same compositions containing RD-119 were run for 23 days more using fresh steel coupons in the static test. Either no rust at all or only a few pin points of rust could be observed at the conclusion of these tests.

A static test was also run at 75° F. using 0.5% and 2.5% RD-119 in 50% methanol, using aluminum coupons. After seven days the coupons appeared unchanged and gained 0.01 mg./sq. cm. in weight.

A comparison was also made of the swelling properties of anti-freeze A, anti-freeze B and RD-119 inhibited anti-freeze compositions on two reference rubbers furnished by the Air Matériel Command for AN-O-366 hydraulic oils. The results of these tests are given in Table VII below.

Table VII
[Per cent rubber swell after 7 days at 140° F. in anti-freeze composition.]

| Composition | "F" Rubber | "H" Rubber |
|---|---|---|
| 55 volume per cent B in tap water | 15.9 | 10.2 |
| 0.5 volume per cent RD-119 in 50% glycol solution | 6.8 | 2.6 |
| 55 volume per cent A in tap water | 14.9 | 6.5 |
| 2.5 volume per cent RD-119 in 50% methyl alcohol | 16.2 | 6.7 |

The data in Table VII demonstrate that RD-119 is particularly valuable in glycol solution from the standpoint of its low swelling action upon rubber.

From the preceding, it is apparent that the present invention has use in a wide variety of applications. For example, in order to reduce corrosion the ammonium, morpholine and cyclohexylamine mahogany sulfonates may be introduced into fresh, brackish or sea water contained in pipes or tanks, into the water contained in drilling mud, may be used in oil well flooding operations, etc.

Reference is made to my copending applications Ser. No. 638,581, filed December 31, 1945, now abandoned; Ser. No. 638,582, filed December 31, 1945, now being Patent No. 2,533,300; Ser. No. 776,415, filed September 26, 1947, being Patent No. 2,533,301; Ser. No. 778,753, filed October 9, 1947, now abandoned; and Ser. No. 86,121, filed April 7, 1949.

I claim:

1. As a new composition of matter, water containing as a corrosion inhibitor from about 0.002 to about 0.4% by weight on an oil free basis of at least one substance selected from the group consisting of ammonium, morpholine and monocyclohexylamine mahogany sulfonate.

2. As a new composition of matter, water containing as a corrosion inhibitor from about 0.002 to about 0.4% by weight of ammonium mahogany sulfonate on an oil free basis.

FRANKLIN M. WATKINS.

REFERENCES CITED

The following references are of record in the file of this patent:

UNITED STATES PATENTS

| Number | Name | Date |
|---|---|---|
| 2,398,193 | Sharp | Apr. 9, 1946 |
| 2,402,793 | White et al. | June 25, 1946 |
| 2,412,634 | Schwartz | Dec. 17, 1946 |